(12) United States Patent
Miyazaki

(10) Patent No.: US 8,964,107 B2
(45) Date of Patent: Feb. 24, 2015

(54) ELECTROCHROMIC LIGHT CONTROL ELEMENT AND IMAGE PICKUP APPARATUS

(75) Inventor: Kazuya Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 13/817,419

(22) PCT Filed: Jul. 26, 2011

(86) PCT No.: PCT/JP2011/067577
§ 371 (c)(1),
(2), (4) Date: Feb. 15, 2013

(87) PCT Pub. No.: WO2012/023419
PCT Pub. Date: Feb. 23, 2012

(65) Prior Publication Data
US 2013/0155315 A1    Jun. 20, 2013

(30) Foreign Application Priority Data
Aug. 20, 2010    (JP) .................. 2010-184665

(51) Int. Cl.
H04N 5/222   (2006.01)
G02F 1/1339  (2006.01)
G02F 1/155   (2006.01)
G03B 9/02    (2006.01)

(52) U.S. Cl.
CPC . *G02F 1/155* (2013.01); *G03B 9/02* (2013.01)
USPC .......................................... 348/370; 349/153

(58) Field of Classification Search
USPC ............................. 348/370; 349/153; 429/30
See application file for complete search history.

(56) References Cited

U.S. PATENT DOCUMENTS 4,132,893 A  *  1/1979  Moraw et al. .................. 378/29
7,522,256 B2 *  4/2009  Horiuchi et al. .............. 349/200

FOREIGN PATENT DOCUMENTS

| JP | 61-59317 A    | 3/1986  |
| JP | 61-245143 A   | 10/1986 |
| JP | H04181211 A   | 6/1992  |
| JP | 4-271323 A    | 9/1992  |
| JP | 11-242208 A   | 9/1999  |
| JP | 2007-258985 A | 10/2007 |
| JP | 2009-104044 A | 5/2009  |

* cited by examiner

*Primary Examiner* — Joel Fosselman
(74) *Attorney, Agent, or Firm* — Canon U.S.A., Inc. IP Division

(57) ABSTRACT

To provide an electrochromic light control element in which a response speed in a low temperature environment can be easily and also efficiently improved.

The electrochromic light control element includes a pair of transparent electrodes provided on a pair of substrates and an electrochromic layer and an ion conductive layer arranged between the pair of the transparent electrodes, in which one of the pair of transparent electrodes is connected via a heater that generates heat through a power distribution and an electrical insulation heat conductive layer.

8 Claims, 3 Drawing Sheets

ELECTROCHROMIC LIGHT CONTROL ELEMENT AND IMAGE PICKUP APPARATUS

TECHNICAL FIELD

The present invention relates to an electrochromic light control element and an image pickup apparatus having the electrochromic light control element.

BACKGROUND ART

In an image pickup apparatus using a solid-state image pickup element, an appropriate exposure is set by a light quantity adjustment unit such as a shutter, an iris aperture, a gain control, and an ND filter, and an image is obtained. In particular, in the image pickup apparatus that obtains movie such as a digital video camera, the light quantity adjustment is carried out by the ND filter due to the following reason.

That is, in a shutter speed or gain control, a light quantity adjustment range is largely restricted because of a request by a frame rate, and a depth of field changes at the same time as the light quantity adjustment in the iris aperture. For that reason, the shutter speed or gain control cannot be used in a case where the depth of field is intentionally set to be shallow, and also a fundamental problem occurs that a resolution power is decreased if a large F value is adopted. This becomes a large constraint particularly in the case of using an image pickup element having a small pixel pitch. Therefore, in the image pickup element that obtains the movie, the light quantity adjustment is most typically carried out by the ND filter. Furthermore, as compared with a case in which a filter having a plurality of fixed optical densities is arranged in a retractable manner on an optical path as in related art, it is simple to arrange a single filter that can arbitrarily change the optical density, and also a degree of freedom in terms of image formation is also high. For the above-mentioned ND filter, a light control element using liquid crystal or an electrochromic material is proposed up to now, but a commercialization of product as the light control unit in the image pickup apparatus does not take place yet due to reasons of a reliability, a durability, and the like.

Also, for the light control element, a light control element is proposed which can improve a response speed even in a low temperature environment where the response speed decreases.

PTL 1 discloses a technology of improving the response speed in the low temperature environment by installing a heating circuit that generates heat through a direct power distribution to a transparent electrode in an electrochromic display apparatus.

However, the configuration of the heating through the direct power distribution to the transparent electrode needs a complex circuit configuration and a complex operation sequence such as a level shift circuit or a switching circuit. Also, a problem occurs that a voltage operation is largely restricted in a case where the heating alone is desired to be carried out without the drive of a display element.

PTL 2 discloses a technology of obtaining a practical response speed even in the low temperature environment by installing a heater electrode that directly heats up a liquid crystal layer in the vicinity of a drive electrode of the liquid crystal layer in a liquid crystal lens.

As the drive electrode and the heater electrode are electrically insulated from each other in this case, the drive can be carried out mutually independently, but this is not sufficient enough in terms of heating efficiency. That is, in the electrochromic element, a rate controlling on the response speed is conducted through an electrochromic layer formed on the transparent electrode and an ion diffusion on a boundary face between a transparent ion conductive layer and the electrochromic layer. For that reason, it is possible to improve the response speed more efficiently by heating an area in the vicinity of the electrochromic layer via a material with a satisfactory heat conductivity as compared with the case of heating an opposing inter-electrode void via a material with the low heat conductivity. For that reason, according to PTL 2, problems exist in a heat conductive path and a heat conductivity of a material on the heat conductive path.

CITATION LIST

Patent Literature

PTL 1 Japanese Patent Laid-Open No. 61-59317
PTL 2 Japanese Patent Laid-Open No. 2007-258985

SUMMARY OF INVENTION

The present invention has been made with the view to the above-mentioned related art and provides an electrochromic light control element in which a response speed in a low temperature environment can be easily and also efficiently improved.

Also, the present invention provides an image pickup apparatus in which an operational temperature range can be largely widened toward a lower temperature side by using the above-mentioned electrochromic light control element.

An electrochromic light control element according to an aspect of the present invention is an electrochromic light control element including a pair of transparent electrodes provided on a pair of substrates and an electrochromic layer and an ion conductive layer arranged between the pair of the transparent electrodes, in which one of the pair of transparent electrodes is connected via a heater that generates heat through a power distribution and an electrical insulation heat conductive layer.

An image pickup apparatus according to an aspect of the present invention has the above-mentioned electrochromic light control element.

According to the aspect of the present invention, it is possible to provide the electrochromic light control element in which the response speed in the low temperature environment can be easily and also efficiently improved.

Also, according to the aspect of the present invention, it is possible to provide the image pickup apparatus in which the operational temperature range can be largely widened toward the lower temperature side by using the above-mentioned electrochromic light control element.

DESCRIPTION OF EMBODIMENT

An electrochromic light control element according to the present invention is an electrochromic light control element including a pair of transparent electrodes provided on a pair of substrates and an electrochromic layer and an ion conductive layer arranged between the pair of the transparent electrodes. Then, one of the pair of transparent electrodes is connected via a heater that generates heat through a power distribution and an electrical insulation heat conductive layer.

Also, an image pickup apparatus according to the present invention has the above-mentioned electrochromic light control element.

As the present invention has the above-mentioned configuration, it is possible to mutually independently carry out the drive of the electrochromic light control element and the heater without using a complex circuit or operational sequence. Also, according to the present invention, it is possible to suppress input power to the heater to low. Also, according to the present invention, a response speed of the electrochromic light control element in a low temperature environment can be easily and also efficiently improved.

First Embodiment

A configuration of an electrochromic light control element according to an embodiment of the present invention will be described in detail by way of examples by using the drawings.

Figure 1:
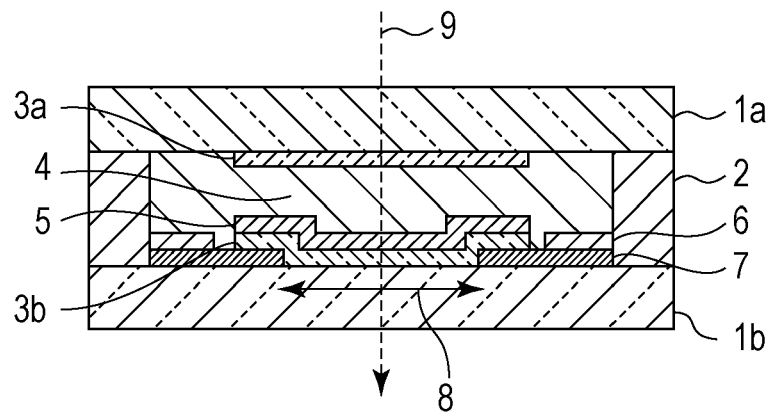
FIG. 1 is a cross sectional view of an electrochromic light control element according to an embodiment of the present invention.
Figure 2:
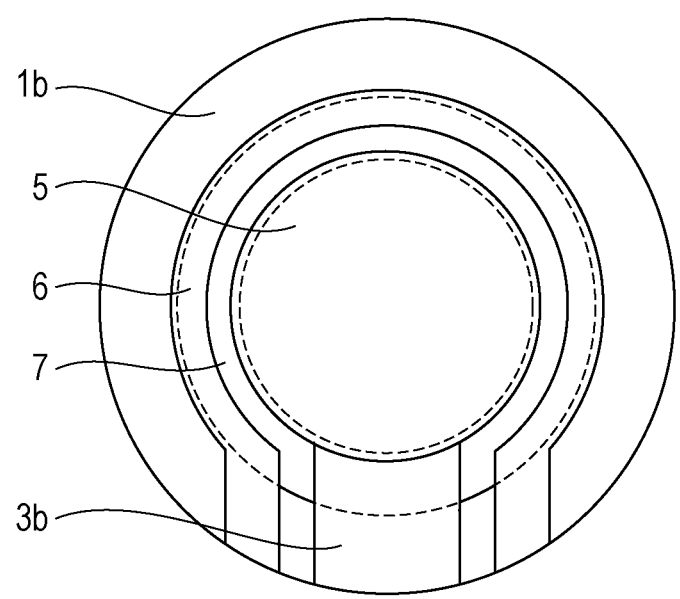
FIG. 2 is a schematic diagram representing an example of a planar configuration of the electrochromic light control element according to the embodiment of the present invention.

FIG. 1 is a cross sectional diagram of the electrochromic light control element according to an embodiment of the present invention. FIG. 2 is a schematic diagram representing an example of a planar configuration of the electrochromic light control element according to the embodiment of the present invention. In FIG. 1, a dotted-line arrow 9 represents a transmission light transmitted through a light control element, and a range of a double sided arrow 8 represents a light quantity restricted area (work).

According to the present embodiment, an example in which an electrochromic layer (EC layer) is formed on only one of the pair of opposing transparent electrodes will be described, but of course the EC layer can also be formed on each of the pair of transparent electrodes. In this case too, the configuration of the element substrate is similar for both the substrates and does not depend on the EC layer.

In the electrochromic light control element according to the embodiment of the present invention, a pair of transparent electrodes 3a and 3b are provided on a pair of substrates 1a and 1b. An EC layer 5 and an ion conductive layer 4 are arranged between the pair of transparent electrodes 3a and 3b. The EC layer 5 is provided in contact with one transparent electrode 3b. One transparent electrode 3b provided on the substrate 1b is connected via a heater 6 that generates heat through a power distribution and an electrical insulation heat conductive layer 7. The one transparent electrode 3b of the pair of transparent electrodes and the heater 6 can be provided on one substrate 1b and also an upper surface of the transparent electrode 3b and an upper surface of the heater 6 can be formed on a same level.

For the substrates 1a and 1b, a glass substrate is used, and for example, an optical glass substrate such as Corning #7059 or BK-7 can be used. A spacer 2 regulates an interval between the pair of substrates, and silica beads, a PET sheet, and the like that are used in a liquid crystal display apparatus can be used.

For the transparent electrodes 3a and 3b, ITO, FTO, ATO, and the like can be used, and it is possible to appropriately perform a design while taking into account optical characteristics (refractive index and transmittance) and electrical characteristics (sheet resistance).

For an ion conductive layer 4, an electrolyte is used. For example, it is possible to use a gel electrolyte manufactured by adding approximately 10% by weight of acrylic resin to approximately 1 M of $LiClO_4$ dissolved in a nonaqueous solution base solvent such as propylene carbonate (PC) as a supporting electrolyte. For the acrylic resin, for example, polymethyl methacrylate (PMMA), polyethylene oxide (PEO), or the like can be used.

For the EC layer 5, an oxidization/reduction coloring EC material in related art can be used without regard to organic or inorganic materials. Requirements for the light control element are a transmittance contrast, wavelength flatness, and a response speed. By taking those into account, for the EC material, it is possible to use a material in which the transmittance is high as much as possible in a decoloration state and also a coloration efficiency (ratio of an optical density to an injected charge amount) is high. Furthermore, in a case where it is difficult to realize a flat absorption with one material in terms of the wavelength flatness, the wavelength flatness can also be realized in a complementary manner by respectively forming the oxidization coloring EC layer and the reduction coloring EC layer on the opposing electrodes.

A heater 6 generates heat through a power distribution, and a transparent electrode material such as ITO, FTO, or ATO can be used. Regarding the heater, a film thickness and a width are decided so that a resistance value in a heat generating area except for an electrode taking out part becomes approximately from 10 to 100Ω while taking into account a specific resistance of the heater material. For example, in FIG. 1 and FIG. 2, in a case where a diameter of the light quantity restricted area 8 is set as 10 mm and chrome is used as the material, the heater may be formed with a film thickness of 100 nm and a width in a range of 40 to 400 μm so as to surround a circumference of the transparent electrode. In this manner, if the power of approximately maximum 1 W can be input to the heater, it is possible to drive the light control element in a practicable range even in the low temperature environment.

Also, a temperature detection unit that measures a temperature of the electrochromic light control element is provided on the substrate, and a heater driving method in which the temperature detection unit controls a current amount distributed to the heater can be used.

A solid-state electrical insulation heat conductive layer 7 is formed so as to connect the heater 6 with the transparent electrode 3b where the EC layer 5 is formed. In FIG. 1 and FIG. 2, the electrical insulation heat conductive layer 7 is formed on a lower layer of the transparent electrode 3b and a lower layer of the heater 6 so as not to overlap with the light quantity restricted area 8. In FIG. 1 and FIG. 2, the heater 6 is formed on an outer side of the light quantity restricted area 8. Also, the electrical insulation heat conductive layer 7 may be formed on or across an upper layer of the transparent electrode and an upper layer of the heater.

As illustrated in FIG. 2, in a case where the EC layer on the transparent electrode from an outside of the heater is heated, the light quantity restricted area can be formed in a circular shape. This is because a temperature increase becomes uniform.

Also, regarding the electrical insulation heat conductive layer 7, an opening may not be formed in the light quantity restricted area as long as the material does not largely restrict the transmittance or largely decrease the transmittance, but the opening may not overlap with the light quantity restricted area.

For the solid-state electrical insulation heat conductive layer, aluminum nitride, silicon nitride, silicon carbide, and the like can be used. A material of the electrical insulation heat conductive layer may be formed by doping an element such as oxygen to the electrode material. These are electrical insulation materials having a resistivity larger than or equal to $1\times10^6$ Ωcm and also good conductors of heat having a heat conductivity larger than or equal to 10 W/mK. On the other hand, the electrolyte described above has the heat conductivity of approximately 0.1 W/mK and is composed of a material having the heat conduction and the heat diffusion 100 times lower than the material of the electrical insulation heat conductive layer.

Although it depends on an element dimension such as a gap interval (thickness of the electrolyte), the power applied to the heater, or the like, by forming the heat conductive layer composed of the electrical insulation heat conductive layer, the temperature increase rate of the transparent electrode where the EC layer is formed becomes larger by at least ten times. According to this, it is possible to efficiently improve the decrease in the response speed in the low temperature environment of the electrochromic light control element.

Also, the heater and the transparent electrode are connected via a good conductor of heat but are electrically insulated from each other, so that it is possible to independently perform the drive mutually at arbitrarily timings. As the power distribution to the pair of transparent electrodes and the power distribution to the heater are respectively carried out independently, the drive of the electrochromic light control element and the drive of the heater can be respectively carried out independently.

Also, one of the pair of transparent electrodes and the heater can be formed of an identical material. In a case where the transparent electrode that drives the electrochromic light control element and the heater are formed of an identical material, an advantage is obtained that the transparent electrode and the heater can be formed at once in a manufacturing process. In this case, the transparent electrode and the heater can be formed on the same level.

An image pickup apparatus according to an embodiment of the present invention has the above-mentioned electrochromic light control element. Next, an example will be illustrated in which the above-mentioned electrochromic light control element is installed in the image pickup apparatus according to the embodiment of the present invention, and an arrangement example of component parts and a flow of a processing will be described.

Figure 3:
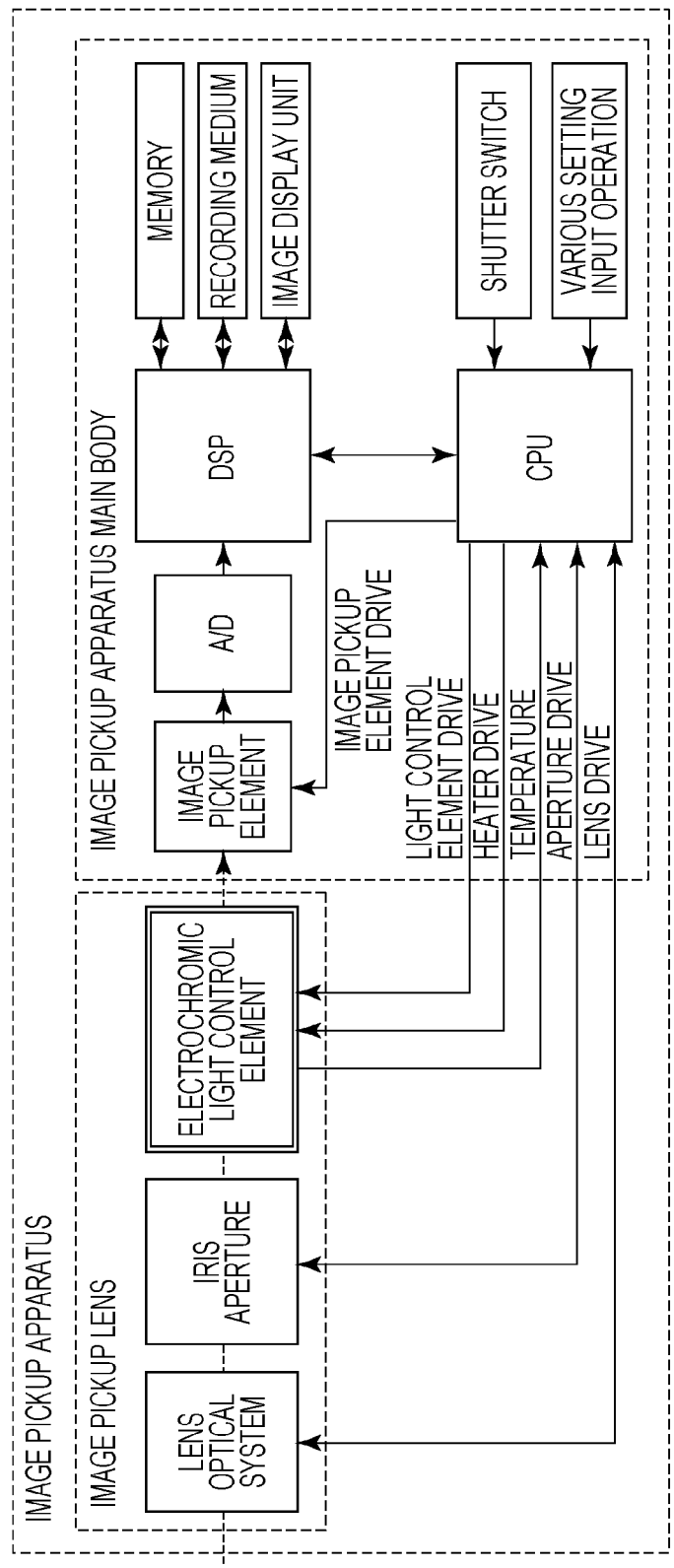
FIG. 3 is a block diagram of an image pickup apparatus according to an embodiment of the present invention.

FIG. 3 is a block diagram illustrating an example of a case in which the electrochromic light control element according to the embodiment of the present invention is incorporated in an image pickup lens and an image pickup apparatus.

Incident light entering a lens optical system is arbitrarily subjected to a light control when passing through the iris aperture and the electrochromic light control element and imaged on the image pickup element. Herein, the light control element is arranged in a subsequent state of the iris aperture in the image pickup lens, but the example of the arrangement is not limited to this, and the light control element may be arranged in a preceding stage of the iris aperture, a preceding stage of the image pickup element in the image pickup apparatus main body, or the like.

An analog signal output from the image pickup element is converted into a digital signal by an A/D converter and sent to a DSP circuit. In the DSP circuit, a predetermined pixel interpolation processing and a color conversion processing are carried out to be saved in a memory unit or a recording medium. Also, with regard to the obtained image data, distance information and luminance information on a principal subject are calculated. On the basis of this, a CPU performs a TTL-system auto focus processing, an automatic exposure processing, an automatic light control processing (the iris aperture drive, the electrochromic light control element drive), and the like.

To drive the electrochromic light control element, first, a power switch is turned ON, and also temperature information is obtained from the temperature detection unit. As a result, a determination is made on whether the heater drive is carried out, and in a case where it is determined that the heater drive is carried out, the heater drive up to a set temperature is carried out. Typically, the temperature of the light control element can be increased to around a room temperature within approximately 10 seconds even in the low temperature environment at a temperature lower than or equal to 0 degree, and as a result, an image pickup preparation is completed.

The electrochromic light control element according to the embodiment of the present invention can easily and also efficiently improve the response speed in the low temperature environment and therefore can be utilized for the image pickup apparatus whose operational temperature range is on a lower temperature side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-184665, filed Aug. 20, 2010, which is hereby incorporated by reference herein in its entirety.

REFERENCE SIGNS LIST 1a, 1b substrate
2 spacer
3a, 3b transparent electrode
4 ion conductive layer
5 EC layer
6 heater
7 electrical insulation heat conductive layer
8 light quantity restricted area
9 transmitted light

The invention claimed is:
1. An electrochromic light control element comprising:
a pair of transparent electrodes provided on a pair of substrates; and
an electrochromic layer and an ion conductive layer arranged between the pair of the transparent electrodes,
wherein one of the pair of transparent electrodes is connected via a heater that generates heat through a power distribution and an electrical insulation heat conductive layer,
wherein the electrochromic light control element further comprises a temperature detection unit that measures a temperature of the electrochromic light control element, and
wherein the temperature detection unit controls a current amount distributed to the heater.
2. The electrochromic light control element according to claim 1, wherein a power distribution to the pair of transparent electrodes and the power distribution to the heater are respectively individually carried out.
3. The electrochromic light control element according to claim 1, wherein one of the pair of transparent electrodes and the heater are provided on one substrate and also an upper surface of the transparent electrode and an upper surface of the heater are formed on a same level.

4. The electrochromic light control element according to claim 1, wherein one of the pair of transparent electrodes and the heater are formed of an identical material.

5. An image pickup apparatus comprising the electrochromic light control element according to claim 1.

6. The electrochromic light control element according to claim 1, wherein the electrochromic layer comprises an oxidization coloring electrochromic layer and a reduction coloring electrochromic layer.

7. The electrochromic light control element according to claim 1 further comprising a light quantity restricted area being formed in a circular shape.

8. An image pickup lens comprising the electrochromic light control element according to claim 1.

* * * * *